UNITED STATES PATENT OFFICE.

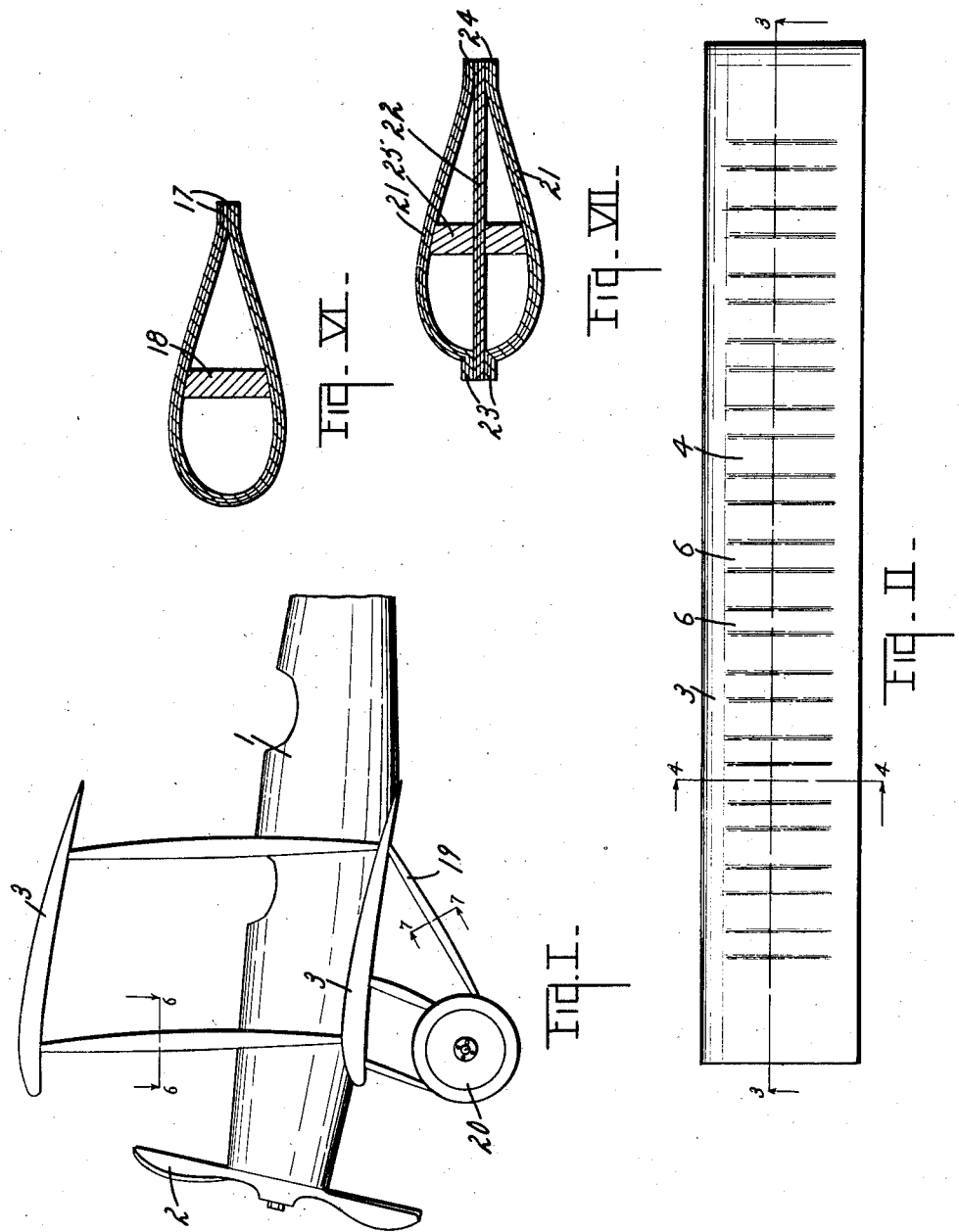

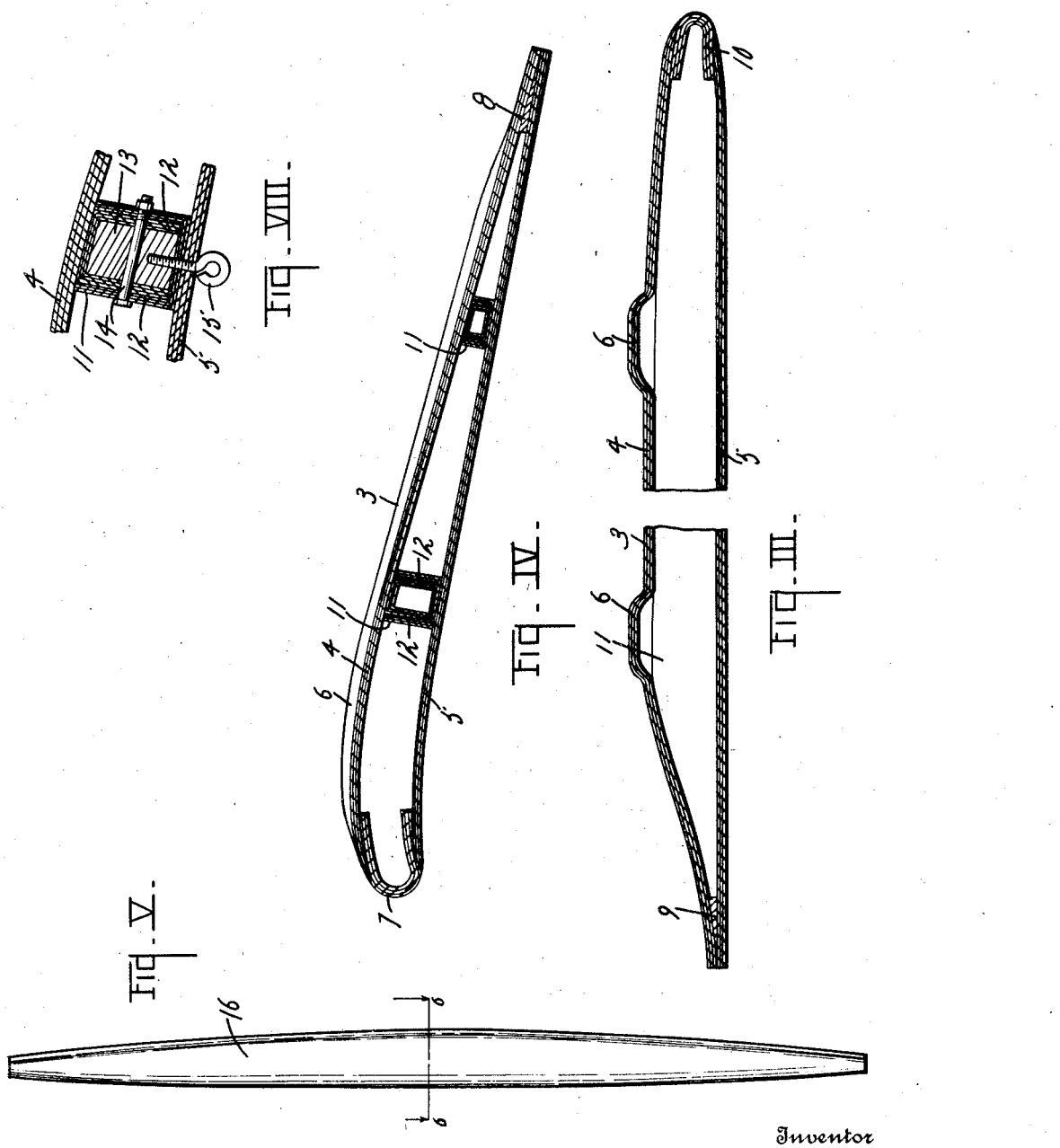

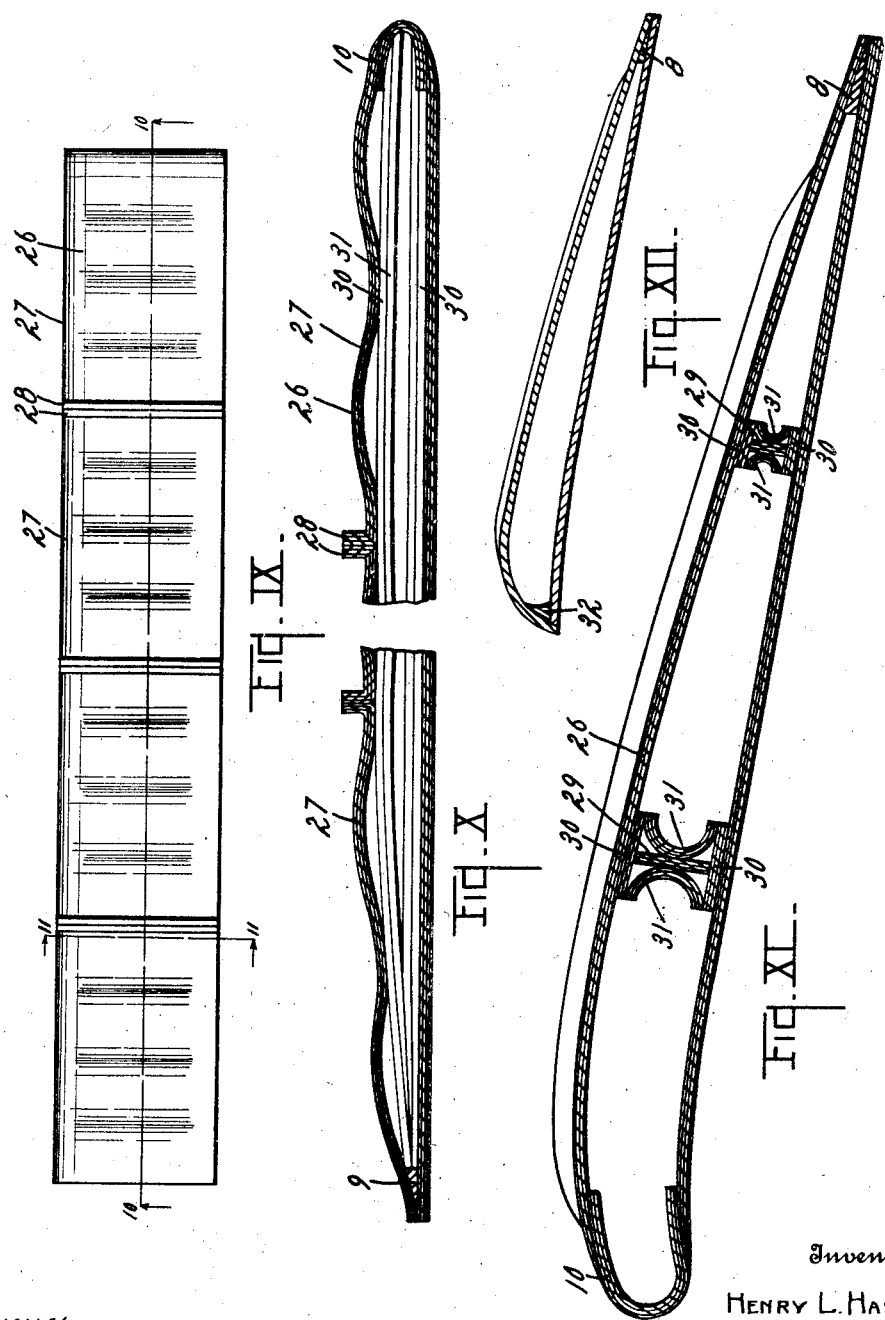

HENRY L. HASKELL, OF LUDINGTON, MICHIGAN, ASSIGNOR TO HASKELITE MANUFACTURING CORPORATION, OF GRAND RAPIDS, MICHIGAN, A CORPORATION OF MICHIGAN.

AEROPLANE.

1,352,600.  Specification of Letters Patent.  Patented Sept. 14, 1920.

Application filed October 23, 1917. Serial No. 198,027.

*To all whom it may concern:*

Be it known that I, HENRY L. HASKELL, a citizen of the United States, residing at Ludington, county of Mason, State of Michigan, have invented certain new and useful Improvemnts in Aeroplanes, of which the following is a specification.

This invention relates to improvements in aeroplanes.

The main objects of this invention are:

First, to provide in an aeroplane an improved plane or wing structure.

Second, to provide in an aeroplane an improved plane or wing structure which is very strong and well adapted to withstand shocks and strains and at the same time is comparatively light in weight.

Third, to provide an improved aeroplane structure which is comparatively economical to produce and capable of very rapid manufacture.

Fourth, to provide an aeroplane wing having an improved longitudinal beam.

Fifth, to provide in an aeroplane an improved strut or supporting bar.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail side elevation of a structure embodying the features of my invention, the parts being shown mainly in conventional form.

Fig. II is a plan view of one of the wings or planes.

Fig. III is an enlarged detail longitudinal section through the plane shown in Fig. II on a line corresponding to line 3—3 of that figure.

Fig. IV is an enlarged transverse section on a line corresponding to line 4—4 of Fig. II.

Fig. V is a side view of one of the wing struts.

Fig. VI is a cross section of the strut shown in Fig. V on a line corresponding to line 6—6 of Figs. I and V.

Fig. VII is a cross section of one of the wheel supporting struts on a line corresponding to line 7—7 of Fig. I.

Fig. VIII is an enlarged detail section showing the structure of one of the wing beams.

Fig. IX is a plan view of a modified form of wing in which the upper wall is formed of sections.

Fig. X is an enlarged detail longitudinal section on a line corresponding to line 10—10 of Fig. IX.

Fig. XI is an enlarged transverse section on a line corresponding to line 11—11 of Fig. IX.

Fig. XII is a transverse section of another embodiment, the plies of veneer forming the top and bottom walls not being illustrated.

In the drawing similar reference characters refer to similar parts throughout the several views, and the sectional views are taken looking in the direction of the little arrows at the ends of the section lines.

Referring to the drawing, the body 1, which is shown conventionally, preferably embodies the features of my co-pending application filed April 9, 1918, Ser. No. 227,469. As its details form no part of this invention they are not shown herein.

The propeller 2 is also shown conventionally, the engine not being illustrated.

The wings, designated generally by the numerals 3, are also shown conventionally in Fig. I. These wings comprise top walls 4 and bottom walls 5 formed of multiple-ply veneer, the plies being secured together throughout by a suitable cement, preferably a cement invented by me, but which I do not describe herein, it being sufficient to state that it is waterproof and permits the conforming of the walls to the desired shape.

The walls 4 and 5 are curved transversely to secure the desired general outline of the wing. The transverse curves of the wing also add to the strength of the wing. The upper wall is also preferably provided with transverse corrugations 6, which add to its strength. Transverse as herein used means parallel with the line of flight and longitudinal means at right angles thereto.

Between the front edges of the walls I dispose a U-shaped front bar 7. This front bar is also formed of multiple-ply veneer suitably conformed, the edges of the wings being lapped upon and glued to the arms thereof. The front edges of the wings are chamfered on their inner sides so as to secure proper fitting of the parts and obviate projections.

The wings are converged rearwardly, their rear edges being brought together as shown in Fig. IV and secured preferably by cementing to a wedge-shaped fillet 8. The walls are also preferably converged at the outer end of the wing, as shown in Fig. III, and secured together with a wedge-shaped fillet 9 between.

At the inner end of the wing is a U-shaped bar 10 arranged substantially as the front bar 7. Where single wings are employed both ends are alike.

The wings are reinforced by longitudinal beams 11 formed of channel-shaped members 12 disposed facing one within the other. These members 12 are formed of multiple-ply veneer cemented throughout and conformed into channel-shape. They are preferably cemented together and to the walls. They provide very strong and, at the same time, comparatively light reinforcing members. These beams preferably have blocks 13 inserted therein and retained by the bolts 14 adapted to receive the screw eyes or other attachments 15 for the bracing and tie rods, which are not shown.

The struts 16 are, in the structure illustrated, oval in cross section and tapered toward each end. These struts are formed of strips of multiple-ply veneer, the plies of which are cemented together throughout, the strips being folded longitudinally with their edges 17 lapped and cemented together.

Longitudinal reinforcing bars 18 are disposed to extend from side to side thereof. The struts thus formed possess great strength, the strength being several times greater than bars of spruce commonly used for this purpose.

The supporting strut 19 for the wheels 20 is formed of a pair of outwardly curved side members 21 formed of strips of veneer suitably conformed. These side members are disposed facing on opposite sides of the web 22 to which their edges 23 and 24 are secured.

Longitudinal bars 25 disposed on opposite sides of the web member 22 support the sides 21. This strut also possesses great strength and is well adapted to withstand the shocks and strains to which it is subjected as a wheel supporting strut. This strut is also preferably oval in cross section and tapered toward each end, as shown.

In the modification of the wing shown in Fig. IX the top wall 26 is formed of sections 27 having flanges 28 turned upwardly on the ends thereof and brought together as shown in Fig. X. These sections 27 have transverse wave-like bends therein instead of the corrugations shown in Figs. III and IV.

The longitudinal beam in this modified form comprises members 29 and 30 disposed like the members of an I-beam with the curved members 31 disposed oppositely between the members 30 and secured thereto and to the member 29. The several members entering into this beam are formed of multiple-ply veneer. When assembled and secured together as illustrated they provide means possessing great strength and effectively withstand strains from all directions.

In the modification shown in Fig. XII the U-shaped front bar is omitted, the front edge of the upper wall being curved downwardly in front of the front edge of the bottom wall and secured thereto with a fillet 32 in the angle of the joint. I have not, in this figure, attempted to illustrate the multiple-ply structure of the walls.

Structures embodying the features of my invention possess great strength and durability and are capable of effectively withstanding the strains and shocks to which they are likely to be subjected in use. The structures are comparatively economical to produce and may be manufactured with great rapidity as the parts are capable of being effectively and rapidly manufactured and assembled.

I have shown my improvements more or less conventionally and have made no attempt to maintain relative proportions of parts. It is believed, however, that the disclosure made will enable those skilled in the art to which my invention relates to embody or adapt the same to meet such conditions as arise in manufacturing.

Having thus described my invention, what I claim as new and desire to secure by Letters Patent, is:

1. A plane or wing for aeroplanes comprising top and bottom walls each formed of multiple-ply veneer cemented together throughout and conformed to transverse curvature, said walls being disposed to converge rearwardly and outwardly with their rear and outer end edges lapped and cemented together with wedge-shaped fillets between, and front and inner end bars formed of multiple-ply veneer cemented together throughout and conformed to U-cross section and disposed between the front and the inner edges of said walls facing inwardly, the walls being lapped and cemented upon the arms of said bars.

2. A plane or wing for aeroplanes comprising top and bottom walls each formed of multiple-ply veneer cemented together throughout and conformed to transverse curvature, said walls being disposed to converge rearwardly with their rear edges lapped and cemented together with wedge-shaped fillets between, and a front bar formed of multiple-ply veneer cemented together throughout and conformed to U-cross section and disposed between the front edges of said walls facing inwardly, the walls being lapped and cemented upon the arms of said bar.

3. A plane or wing for aeroplanes comprising top and bottom walls each formed of multiple-ply veneer cemented together throughout and conformed to transverse curvature, the top wall having transverse corrugations therein, said walls being disposed to converge rearwardly with their rear edges lapped and cemented together with wedge-shaped fillets between, and a front bar formed of multiple-ply veneer cemented together throughout and conformed to U-cross section and disposed between the front edges of said walls facing inwardly, the walls being lapped and cemented upon the arms of said bar.

4. A plane or wing for aeroplanes comprising top and bottom walls of multiple-ply veneer disposed to converge rearwardly and outwardly with their rear and outer end edges secured together, and U-shaped front and inner end bars of multiple-ply veneer disposed facing inwardly between the front and the inner end edges of said walls which are secured upon the arms thereof.

5. A plane or wing for aeroplanes comprising top and bottom walls of multiple-ply veneer having transverse curves therein, the top wall also having transverse corrugations therein, said walls being disposed to converge rearwardly, a U-shaped front bar of multiple-ply veneer disposed facing inwardly between the front edges of said walls which are lapped and secured to the arms thereof, and a beam disposed between and to which said walls are secured comprising channel members of multiple-ply veneer disposed facing one within the other and secured together.

7. A plane or wing for aeroplanes comprising top and bottom walls of multiple-ply veneer having transverse curves therein, the top wall also having transverse corrugations therein, said walls being disposed to converge rearwardly, and a U-shaped front bar of multiple-ply veneer disposed facing inwardly between the front edges of said walls which are lapped and secured to the arms thereof.

8. A plane or wing for aeroplanes comprising top and bottom walls of multiple-ply veneer, a U-shaped front bar of multiple-ply veneer disposed facing inwardly between the front edges of said walls which are lapped and secured to the arms thereof.

9. A plane or wing for aeroplanes comprising top and bottom walls of multiple-ply veneer, and a longitudinal beam disposed between and to which said walls are secured comprising channel members of multiple-ply veneer disposed facing one within the other.

10. A bar of oval cross section tapered toward each end comprising outwardly curved side members conformed from multiple-ply veneer disposed facing, a web member disposed between said side members and upon which the longitudinal edges thereof are lapped and secured, and longitudinal reinforcing members disposed on opposite sides of said web and engaging the side members centrally thereof.

11. A bar of oval cross section tapered toward each end comprising outwardly curved side members conformed from multiple-ply veneer disposed facing, and a web member disposed between said side members and upon which the longitudinal edges thereof are lapped and secured.

In witness whereof, I have hereunto set my hand and seal in the presence of two witnesses.

HENRY L. HASKELL. [L. S.]

Witnesses:
E. L. EDWARDS,
H. T. STREBERG.